Patented June 6, 1933

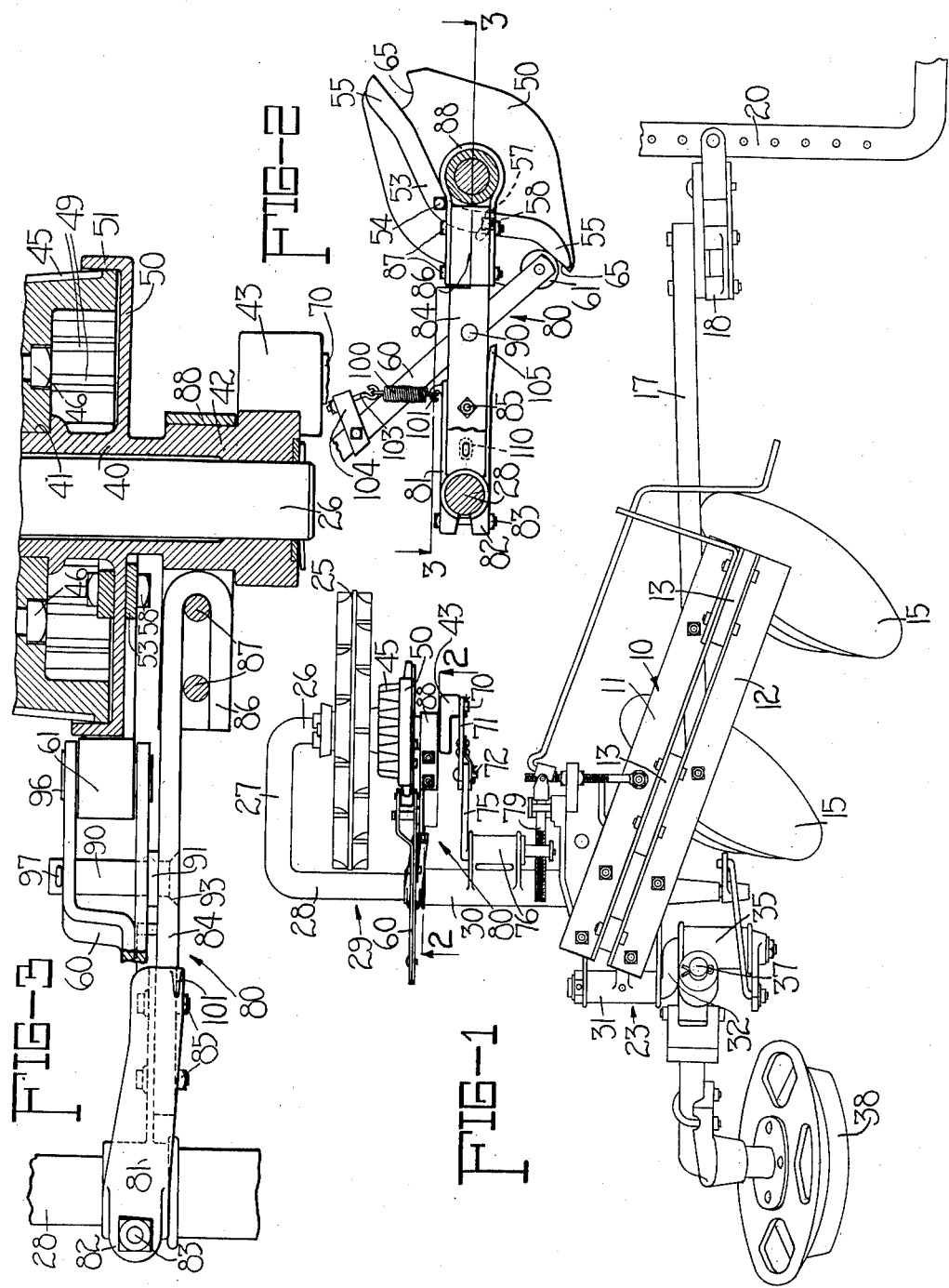

1,913,004

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

PLOW

Application filed January 2, 1932. Serial No. 584,385.

The present invention relates generally to agricultural implements, particularly plows, in which a power lift mechanism is embodied.

One form of power lift which has been generally successful, particularly on plows and the like, is a construction in which the land wheel mounting includes a crank axle which extends around the outside of the land wheel, the latter being mounted on the crank portion and is adapted to swing around the axis of the axle portion. The crank portion enters the land wheel from the outer side and extends inwardly and is provided with a clutch of the half revolution intermittently operable type mounted on the inner end of the crank portion on the inside of the wheel. The generic features of this form of power lift are clearly disclosed and claimed in the patent to Carl G. Strandlund, Re. 15,828, re-issued April 29, 1924.

In the type of power lift just referred to where the swinging crank axle includes an arm portion extending from the axle portion and terminating in an inwardly directed crank portion upon which the land wheel and clutch parts are mounted, it is necessary, of course, that the material of the swinging crank axle be made strong enough to resist the stresses involved in raising the plow. Where the power lift clutch includes a member rotatable in the lifting operation on the inwardly extending crank portion and reacting through a thrust bar against the frame there sometimes occurs a tendency for the crank portion of the swinging crank axle to bend away from the axle or journal portion. Heretofore, to secure the necessary rigidity of the swinging crank axle construction it has been customary to form the crank axle of stock large enough to possess such inherent strength that spreading will not occur. Under certain conditions where this spreading occurs it may affect the operation of the power lift clutch. It is of vital importance to the proper operation of a lifting clutch that the crank end of the crank axle be positively held in a fixed position with respect to the journal or axle portion of the swinging crank axle. When this crank portion is allowed to spread the position of the roller which throws out the clutch and the lifting link by which the weight of the plow is supported may, under certain conditions, be affected to such an extent that the lifting dog is not thrown out properly when the plow is in a lowered position, thereby causing a chattering of the clutch. This arises because the spreading of the crank axle permits the rotatable member to move past the dead center position with respect to the thrust bar, so that the weight of the plow tends to swing the rotatable member away from the trip lever and cam the roller on the end of the trip lever out of the notch in which it engages to hold the lifting dog out, thereby allowing the latter to engage sufficiently to initiate the lifting action which, however, is interrupted the moment the rotatable member is moved a slight amount. This rapid successive engaging and disengaging is known as chattering. Furthermore if the lower crank portion of the axle spreads another difficulty is introduced in that it becomes difficult to trip the plow from raised position, principally because the rotatable member has, by virtue of the spreading of the crank axle, moved past its normal position.

With the above factors in mind, the present invention addresses itself to the provision of means for positively preventing any spreading of the crank portion of the crank axle while making it possible to utilize a crank axle of somewhat smaller dimensions. Specifically, it is the principal object of the present invention to provide a tie link or reenforcing member connected between the journal or axle portion of the crank axle and the crank portion upon which the land wheel and lifting clutch structure are mounted. Particularly, it is the object of the present invention to provide a tie member connected between the inner end of the inwardly directed crank portion and the axle portion of the swinging crank axle. By reason of this construction it is possible to considerably reduce the size of the crank axle and at the same time be assured against any spreading of the crank portion away from the journal or axle portion of the swinging axle.

Another object of the present invention is to utilize the tie member or reenforcing member as a support upon which some of the clutch operating parts can be mounted. This I consider an important feature of the present invention in that, while the feature of preventing spreading of the axle is extremely desirable, as far as preventing the chattering of the clutch is concerned, the important thing to be accomplished is to prevent any displacement of the trip lever with respect to the rotatable member of the clutch. If this relation is not disturbed the power lift will not chatter, even though a certain amount of separation between the crank and axle portions of the crank axle should occur. Therefore to prevent any spread at all stops the trouble at the source while supporting the trip lever on a member held in fixed relationship with respect to the crank portion holds the trip lever in proper position regardless of spread and prevents any objectionable results because of the amount of spread which does occur.

A further object of the present invention is to so dispose the tie link or reenforcing member that it will be advantageously positioned so as to best resist the reactions to which it is subjected during the operation of the power lift mechanism. These and other objects of the present invention will be apparent to those skilled in the art after a consideration of the following detailed description of the preferred structural embodiment, taken in conjunction with the accompanying drawing in which:

Figure 1 is a top plan view of a disk plow embodying the features of the present invention;

Figure 2 is a view, partly in section and partly in elevation and taken along the line 2—2 of Figure 1, showing the relationship between the tie member or reenforcing link and the crank and axle portions of the swinging crank axle; and Figure 3 is a fragmentary enlarged top view of the structure, corresponding in general to the line 3—3 of Figure 2, showing in detail certain of the power lift clutch parts.

Referring now to the drawing, particularly Figure 1, it will be observed that the disk plow there illustrated is practically identical with the plow disclosed and claimed in the copending application filed July 26, 1929, by Carl G. Strandlund, Serial No. 381,103 (Case 18). As more fully disclosed in the copending application just identified, the disk plow illustrated comprises a beam structure 10 comprising two angle bars 11 and 12 between which are supported a plurality of standards 13, the latter supporting furrow opening disks 15. The forward end of the beam structure 10 is carried upon a draft bar 17 the forward end of which is connected, as by an adjustable draft coupling member 18, to a tractor or other source of draft, represented in its entirety by the draw bar 20. The rear end of the beam structure 10 is carried upon a wheel supported frame structure indicated in its entirety by the reference numeral 23. The frame structure 23 may be of any desired construction and supported on any desired arrangement of wheels, the preferred form, however, being that illustrated in which a land wheel 25 is journaled on the laterally inturned or inwardly directed crank portion 26 connected by an arm portion 27 with the axle portion 28 of a swinging crank axle 29 journaled on the frame structure 23 and received in a long bearing sleeve 30 forming a part of the frame structure. The frame 23 also includes a second sleeve portion 31 in which is journaled a crank 32, and movably mounted on the crank for swinging movement is a casting 35. Rotatably mounted in a bearing sleeve forming a part of the casting 35 is a spindle 37 upon which a rear furrow wheel 38 is journaled.

The land wheel 25 forms a part of a power lift mechanism which is operative to swing the crank axle 29 to raise and lower the frame 10 as will now be described. A sleeve 40 (Figure 3) is mounted on the laterally inwardly directed crank portion 26 of the swinging crank axle 29, and this sleeve member 40 includes a bearing portion 41, a hub 42 and a crank 43, the latter being disposed at the innermost end of the sleeve 40 and adjacent the hub portion 42. The wheel 25 includes a drum 45, the latter being preferably bolted to the wheel by bolts 46, and the wheel and drum are mounted for rotation on the sleeve 40, the latter thus serving as journal means for the land wheel 25 and is normally stationary with respect to the laterally directed crank or spindle portion 26. The drum 45 is provided with interior corrugations 49, the drum 45 thus serving as a part of a more or less conventional type of half revolution power lift clutch.

The sleeve 40 also includes a radially extending plate portion 50 having a laterally outwardly directed flange 51 adapted to embrace the laterally inner edge of the drum 45. A clutch throw-out lever 53 is pivoted, as by a pivot bolt 54, to the plate portion 50 and includes oppositely directed arms 55 by which the power lift clutch is controlled through a trip lever later to be described in detail. The throw-out lever 53 is mounted on the outside of the plate portion 50, and the latter is provided with a slot 57 through which a pin or bolt 58 carried by the lever 53 extends. The bolt 58 supports a clutch roller (not shown) which engages the corrugations 49 on the drum 45 so as to clutch or lock the sleeve 40 and the plate portion 50 to the drum 45 whereby the sleeve 40 rotates with the wheel 25. Normally, however, the roller carried by the throw-out lever 53 is held out of engagement by a trip lever 60 having a roller 61 at its lower end which engages one of the arms 55 and one of the notches 65 formed on the plate portion 50. The engagement of the roller 61 in one of the notches 65 serves to hold the plate portion 50, and hence the rotatable sleeve 40, from rotating. Like the arms 55, the notches 65 are preferably oppositely disposed.

During the operation of the power lift clutch in which the sleeve 40 is locked to the drum 45 and the wheel 25 to rotate therewith, the rotation of the sleeve 40 causes the rotation of the crank 43, see Figure 1. The innermost end 70 of the crank 43 is reduced to receive the lower end of a thrust bar 71. The upper end of the thrust bar 71 is connected, as at 72, with an adjusting crank 75 journaled in a sleeve 76 formed on or secured to the frame 23. The adjusting crank 75 is normally held in fixed relation with respect to the frame 23 and the beam 10 by an adjusting mechanism indicated in its entirety by the reference numeral 79. This adjusting mechanism forms no part of the present invention except in so far as it relates to the power lift feature. The adjusting crank 75 forms an abutment on the frame against which the thrust bar 71 acts when the crank 43 is rotated. When the power lift is actuated the thrust of the bar 71 causes the swinging crank axle 29 to swing downwardly carrying with it the land wheel 25 and hence raising the beam 10 and the frame 23.

Under some conditions, as mentioned above, the reaction developed by the rotation of the crank 43 in lifting the plow tends to cause the crank portion 26 to bend or spread out of its proper fixed relation with respect to the axle or journal portion 28 of the swinging crank axle 29. Normally the crank portion 26 is parallel to the axle portion 28 and unless this relation is substantially maintained during the life of the implement the operation of the power lift clutch mechanism may be seriously affected. In order to positively hold the two portions 26 and 28 of the swinging crank axle 29 and to positively prevent spreading or separation of these parts the present invention contemplates a provision of a tie member or reenforcing link indicated in its entirety by the reference numeral 80. As best illustrated in Figure 1, this tie or reenforcing member 80 acts as an arm cooperating with the arm 27 to rigidly connect the journal means receiving the land wheel 25 and the power lift clutch mechanism with the swinging crank axle 29.

Referring now more particularly to Figures 2 and 3, the tie member 80 comprises a casting 81 having a split end 82 which embraces the portion of the crank axle 29 adjacent the sleeve 30 and is rigidly secured or clamped thereto by means of a bolt 83 passing through the split ends 82. A flat bar 84 is bolted, as by bolts 85, to the casting 81 at one end and at its outer end is bent back on itself, as indicated at 86', to embrace two bolts 87 which pass through the arms of a U-shaped member or strap 88 rotatably received upon the hub portion 42 of the sleeve 40. Thus, any reaction developed by the rotation of the cranked end 43 of the sleeve 40 will be directly transmitted to the reenforcing member 80 and will not exert any tendency acting to spread or bend the crank portion 26 relative to the axle or journal portion 28 of the swinging crank axle 29. By virtue of the bolts 83 and 87 the member 80 is removable.

Not only does the reenforcing member or link 80 serve to strengthen these parts and provide a strong and sturdy implement, but use is made of the reenforcing member 80 to form a support for the trip lever 60. For this purpose the bar 84 carries a pin 90 projecting laterally outwardly of the link 80. The pin 90 is provided with a collar 91, preferably formed integrally with the pin 90, which bears against the outer side of the bar 84. The end of the pin 90 projecting through the other side of the bar 84 is riveted into the countersunk portion of the opening through which the pin projects, as indicated by the reference numeral 93.

The trip lever 60 preferably comprises a pair of bars connected together in any desired manner and separated at their lower ends for the purpose of receiving therebetween the roller 61 journaled on a stud 96 carried at the lower ends of the bars forming the lever 60. These bars at their separated ends are suitably apertured to receive the pin 90, and a cotter key or other suitable means 97 is carried by the pin 90 to hold the trip lever 60 in place on the pin 90.

The trip lever 60 is normally held in one or the other of the recesses 65 or against the outer periphery of the normally stationary plate portion 50 by means of a tension spring 100, see Figure 2, the lower end of which is connected to a hook 101 formed on the casting 81. The upper end of the spring 100 is adjustably connected by means of an eye bolt 103 to a bracket 104 secured to the upper end of the trip lever 60. The casting 81 also includes a projection 105 formed thereon to act as a stop for the lever 60 to limit its swinging movement in one direction.

The link 80, regardless of its function in preventing separation or spread of the crank axle, also serves an important function in providing a pivotal support for the trip lever which is maintained a given distance from the axis of the crank portion 26 regardless of any spread in the crank axle. As long as this distance remains the same the proper relation between the trip lever and the clutch is maintained. A considerable amount of separation between crank portion 26 and the journal portion 28 could be tolerated if this distance between the crank portion 26 and the pin 90 were maintained. That is, even if portion 85 became loosened so that the crank portion 26 would spread from the journal portion 28, the fact that the pin 90 would be held at a fixed distance from the crank portion 26 would still permit the proper operation of the clutch. Particularly would there be no difficulty in tripping the plow from a raised position.

In order to provide for adjusting the effective length of the tie member or reenforcing link 80 the bar 84 and the casting 81 are made relatively adjustable by the provision of elongated slots 110 in the casing 81 through which the bolts 85 extend, as best shown in Figure 2. This adjustment is desirable to take care of manufacturing variations.

While I have described in detail the preferred structural embodiment of the present invention it will be apparent to those skilled in the art that my invention is not limited to the specific means shown and described but that, in fact, widely different means may be employed in the practice of the broader aspects of my invention.

What I claim, therefore, and desire to secure by Letters Patent is:

1. In a power lift agricultural implement, an axle, a power lift clutch mechanism including a rotatable wheel, journal means supporting said wheel for rotation, and means disposed on opposite sides of said wheel to support said journal means for swinging movement about the axis of said axle.

2. In a power lift agricultural implement, an axle, a power life clutch mechanism including a rotatable wheel, journal means supporting said wheel for rotation, and means for supporting both ends of said journal means for swinging movement about the axis of said axle.

3. In a power lift agricultural implement, an axle, a power lift clutch mechanism including a rotatable wheel, journal means supporting said wheel for rotation, and means comprising a pair of arms for supporting both ends of said journal means for swinging movement about the axis of said axle, one of said arms being adjustable.

4. In a power lift agricultural implement, a swinging crank axle, a power lift clutch mechanism including a wheel journaled on the crank portion of said axle, and means connecting the end of said crank portion with the axle portion of said crank axle.

5. In a power lift agricultural implement, a swinging crank axle including a crank portion connected with an axle portion by an arm, a power lift clutch mechanism including a wheel journaled on the crank portion of said axle, and means connecting the end of said crank portion opposite said arm with the axle portion of said crank axle.

6. In a power lift agricultural implement, a swinging crank axle including a crank portion connected with an axle portion by an arm, and a tie member connected between said crank portion and said axle portion to prevent spreading thereof.

7. In a power lift agricultural implement, a swinging crank axle comprising a crank portion connected in parallel relation with an axle portion by an integral arm, a power lift clutch mechanism including a wheel journaled on the crank portion of said axle, and a second arm removably connected with said axle portion and said crank portion and cooperating with said integral arm in maintaining said parallel relationship.

8. A power lift agricultural implement comprising a frame, a crank axle having a swinging arm portion, lifting means including a thrust bar connected with said frame, an optionally operable power lift clutch mounted on said crank axle and adapted to actuate said thrust bar, and an arm connected between said clutch and said frame and disposed adjacent said thrust bar and aiding said arm portion in sustaining the reaction of said clutch.

9. A power lift agricultural implement comprising a frame, a swinging crank axle journaled for rocking movement on said frame, a power lift clutch mechanism including a wheel journaled on the crank portion of crank axle and a rotatable crank adapted to be optionally connected to rotate with said wheel, a thrust bar connected with said frame and said rotatable crank, and means disposed adjacent said crank and connected with said axle and with said rotatable crank to take the reaction of the latter.

10. A power lift agricultural implement comprising a frame, a swinging crank axle journaled for rocking movement on said frame, a power lift clutch mechanism including a wheel journaled on the crank portion of crank axle and a rotatable crank having a hub and adapted to be optionally connected to rotate with said wheel, a thrust bar connected with said frame and said rotatable crank, and a tie member connected with said axle and journaled on said hub to prevent spreading of the crank axle.

11. A power lift agricultural implement comprising a frame, an axle journaled on said frame and including a crank portion, a power lift clutch mechanism including a rotatable wheel mounted on the crank portion, a trip lever controlling the action of said clutch mechanism, and means held in fixed relation with respect to said crank portion for supporting said trip lever.

12. A power lift agricultural implement comprising a frame, a swinging crank axle journaled on the frame and including a crank portion connected with an axle portion by an intermediate arm, lifting means including an optionally operable half revolution clutch mounted on said crank portion, a tie member connected between said crank portion and said axle portion to prevent spreading thereof, and a trip lever for said clutch mechanism mounted on said tie member.

13. A power lift plow comprising a frame, ground wheels supporting at least a portion of said frame for vertical movement, lifting means including a half revolution clutch optionally operable by one of said ground wheels and a thrust bar connected between said clutch and said frame, a tie member disposed adjacent said thrust bar to take the reaction thereof, and a trip lever operable to control said clutch and pivotally mounted on said tie member.

14. A power lift plow comprising a frame, ground wheels supporting said frame for vertical movement, a swinging crank axle journaled on said frame and carrying one of said ground wheels, lifting means including a thrust bar connected with said frame and a half revolution clutch mounted on the crank portion of said crank axle and optionally operable by said one of the ground wheels to actuate said thrust bar, means disposed adjacent said thrust bar and connecting said clutch with said axle, and a pivotally mounted lever carried by said last named means and operable to control the operation of said half revolution clutch.

15. A power lift plow comprising a frame, a swinging crank axle journaled on said frame and including an inwardly directed crank portion connected with the axle for movement about the axis of the latter, a ground wheel and a half revolution clutch mounted on said inwardly directed crank portion, said clutch including a normally stationary sleeve terminating in an inner crank, a thrust bar connected with said crank and with said frame, and a tie link fixed at one end to the axle portion of said crank axle and rotatably connected with said sleeve between said crank and said half revolution clutch.

16. A power lift agricultural implement comprising a frame, a swinging crank axle journaled on said frame and including a laterally directed crank portion, a normally stationary member mounted on said laterally directed crank portion and including a hub and rotatable crank, a supporting ground wheel journaled on said member and including a drum disposed adjacent said hub, half revolution clutch means adapted to lock said drum with said member to cause the latter to rotate with said wheel, and a tie member including a part embracing said hub and a part fixed to said axle.

17. A power lift agricultural implement comprising a frame, a swinging crank axle journaled for rocking movement on said frame, said swinging crank axle including a laterally directed crank portion spaced from the axis of said rocking movement, a normally stationary sleeve mounted on said laterally directed crank portion and including a crank and a radially outwardly extending plate portion, a wheel having a drum with interior corrugations and journaled on said sleeve member, said drum being disposed adjacent said plate portion of the sleeve, a lever pivotally mounted on said plate portion and including arms extending to opposite sides thereof, interengaging roller means carried by said plate portion and shiftable by said lever into and out of engagement with the corrugations of said drum whereby to lock said sleeve with said drum to rotate with said wheel, a reenforcing member connected with said crank and with said axle and including a part embracing said sleeve between the crank thereon and said plate portion, and a trip lever pivotally mounted on said reenforcing member and cooperating with said oppositely extending arms to control the engagement of said roller means.

18. A power lift agricultural implement comprising a frame, a crank axle journaled on said frame and including a crank portion, a power lift mechanism including a rotatable wheel mounted on the crank portion, a trip lever controlling the action of said clutch mechanism, and means separate from said crank axle and held in fixed relation with respect to said crank portion for pivotally supporting said trip lever.

In witness whereof, I hereunto subscribe my name this 24th day of December, 1931.

WALTER H. SILVER.